(No Model.)
J. DITTRICK.
FIRE ESCAPE.
No. 319,888. Patented June 9, 1885.
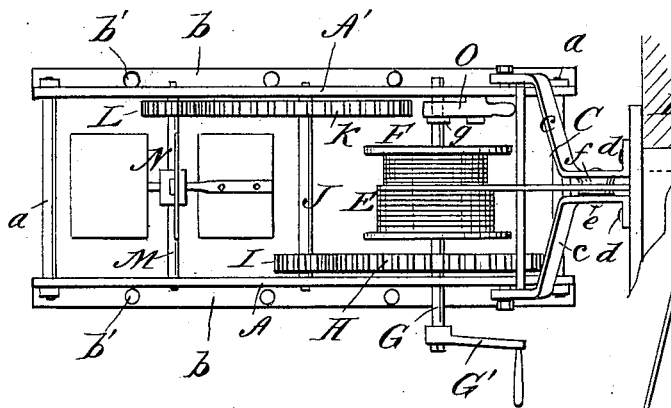
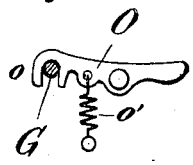
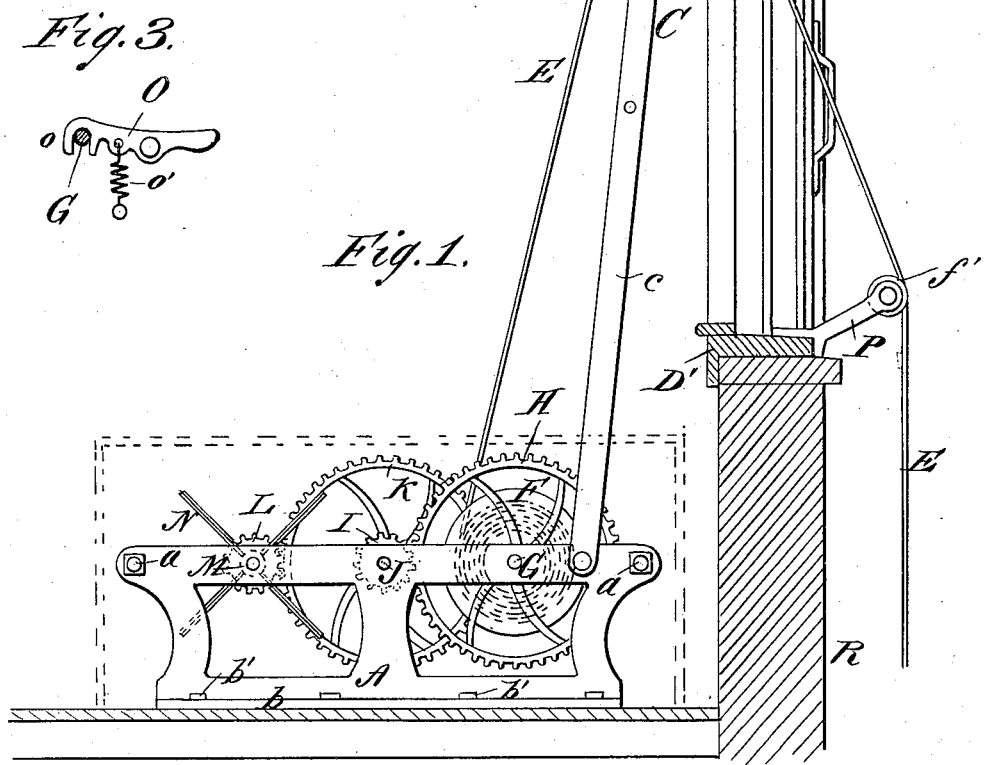
WITNESSES:
Donn Twitchell
C. Sedgwick
INVENTOR:
J. Dittrick
BY Munn & Co
ATTORNEYS.
N. PETERS, Photo-Lithographer, Washington, D. C.

UNITED STATES PATENT OFFICE.

JOHN DITTRICK, OF SMITH'S FALLS, ONTARIO, CANADA.

FIRE-ESCAPE.

SPECIFICATION forming part of Letters Patent No. 319,888, dated June 9, 1885.

Application filed October 20, 1884. (No model.)

*To all whom it may concern:*

Be it known that I, JOHN DITTRICK, of Smith's Falls, in the Province of Ontario and Dominion of Canada, have invented a new and Improved Fire-Escape, of which the following is a full, clear, and exact description.

Reference is to be had to the accompanying drawings, forming part of this specification, in which similar letters of reference indicate corresponding parts in all the figures.

Figure 1 is a side elevation of my invention arranged by a window, ready for use. Fig. 2 is a plan view of the same, and Fig. 3 is a side elevation of a dog for holding the drum-shaft in gear.

The invention will first be described in connection with the drawings, and then pointed out in the claims.

The frame of the fire-escape is composed of the side plates A A', tied together by the rods *a a*. The plates A are flanged at their lower edges, as shown at *b*, and are adapted to be secured to the floor B by the bolts or spikes *b' b'*, passed through the flanges *b* and driven into the floor, as will be understood from Fig. 1.

Rising from the side pieces A A' is the upright C. This is composed of the side pieces *c*, which are pivoted to the plates A A' and bent so as to come together a short distance above the side plates A A', and they are of such length that they reach to the top of the window-frame D, where they are secured by the nails *d*, or otherwise.

Between the plates *c c* is journaled upon the bolt *e* the groove-pulley *f*, over which the descending rope E passes.

F is the winding-drum upon which the descending rope E is wound. This drum is placed upon the crank-shaft G, which is journaled in the side plates A A'.

Upon the shaft G is secured the large cog-wheel H. This meshes with the pinion I, secured upon the shaft J. Upon the shaft J is secured also the cog-wheel K. This meshes with pinion L on shaft M, on which latter shaft is fixed the fan N, which serves as a retarding device to the too rapid paying out of the rope E when the weight of a person is placed upon it for descending.

The crank-shaft G is formed or provided near the inner surface of the side plate, A', with the collar *g*, and pivoted to the inner surface of the said plate A' is the dog O, the head *o* of which is adapted to straddle the shaft G between the collar *g* and the side plate A', so as to hold the shaft in position to gear the cog-wheel H with the pinion I, as shown in Fig. 1. The dog O is normally held down in contact with the shaft G by the spring *o'*; but by lifting the end *o* of the dog O the shaft G may be shoved endwise in its bearings to ungear the cog-wheel H from the pinion I, so that the shaft G and drum E may be turned by the crank G' for winding the descending rope E upon the drum.

The descending rope E, when in position for use after leaving pulley *f*, is passed over pulley *f'*, journaled in the arm P, secured to the window-sill D', as shown in Fig. 1, so that a person in descending will be held away from the wall R of the building, so as not to come in contact with it while descending.

In use, the rope E being wound upon the drum F, the outer end of the rope will first be passed over the pulleys *f f'*, and the person to descend will grasp or, by means of belts or otherwise, secure himself to the rope E and throw himself out of the window. His weight upon the rope E will cause the rope to unwind from the drum F; but, owing to the retarding action of the fan N and intermediate gearing, the unwinding or paying out of the rope will be slow, so that the person will be lowered to the ground without danger of injury. One person having thus escaped, if there is another to come down he will first raise the dog O, shove the wheel H out of gear, and turn the crank G to wind up the rope. This done, the wheel H will be brought again in gear with the pinion I and the dog O replaced, when the second person will place himself upon the rope E and descend, and this may be repeated until all of the persons in the building have been safely landed upon the ground.

My invention is useful also in lowering merchandise, &c., from buildings to the ground or from one story of a building to another.

Having thus described my invention, what I claim as new, and desire to secure by Letters Patent, is—

1. The drum-shaft G, adapted to be moved endwise, in combination with the dog O and collar $g$, substantially as and for the purposes described.

2. The combination, with the frame and operative parts of the fire-escape and the rope E, of the upright C, having pulley $f$, substantially as and for the purposes set forth.

3. The side pieces, A A', adapted to be secured to the floor, in combination with the shafts G J M, drum F, cog-wheels H I K L, and fan N, the shaft G being adapted to be shoved endwise, substantially as and for the purposes set forth.

JOHN DITTRICK.

Witnesses:
 A. GRAHAM,
 VANNIE CLEMO.